June 9, 1953  F. F. STARZYK  2,641,094
MEAT PATTY FORMING AND SEALING MACHINE
Filed Nov. 23, 1948  3 Sheets-Sheet 1

Inventor:
Frederick F. Starzyk.
By Thiess, Olsen & Mecklenburger
Attys.

June 9, 1953        F. F. STARZYK        2,641,094
MEAT PATTY FORMING AND SEALING MACHINE
Filed Nov. 23, 1948        3 Sheets-Sheet 2
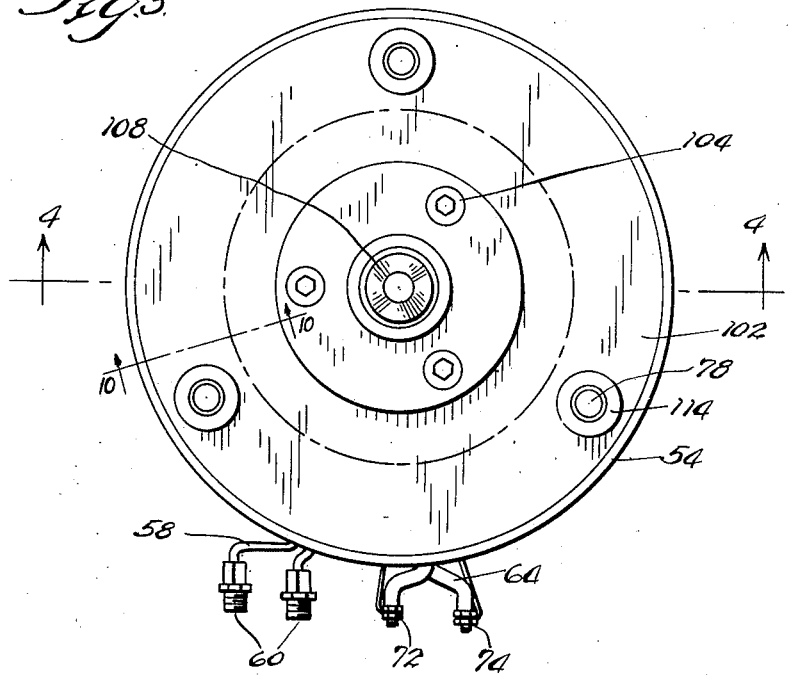
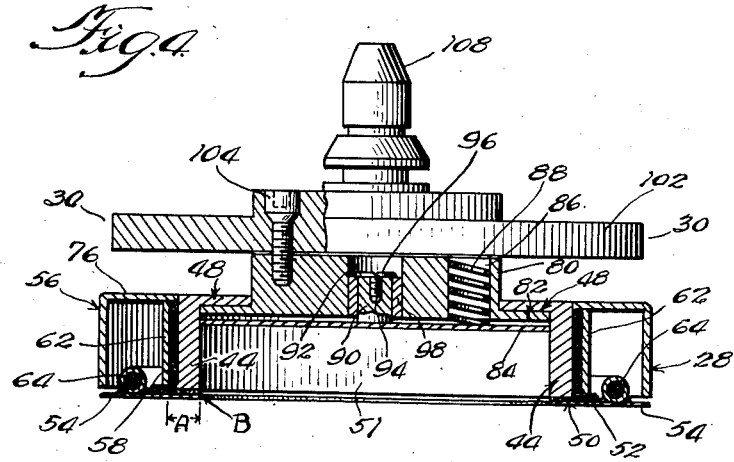
Inventor:
Frederick F. Starzyk.
By Thiess, Olson & Mecklenburger
Attys.

June 9, 1953 F. F. STARZYK 2,641,094
MEAT PATTY FORMING AND SEALING MACHINE
Filed Nov. 23, 1948 3 Sheets-Sheet 3
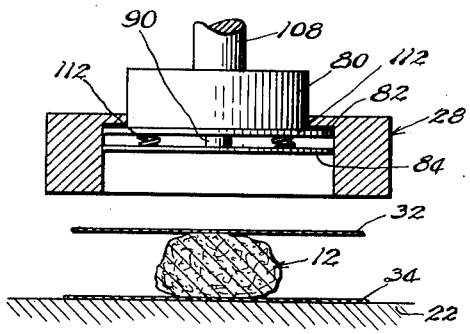
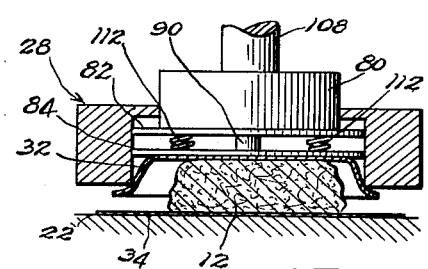
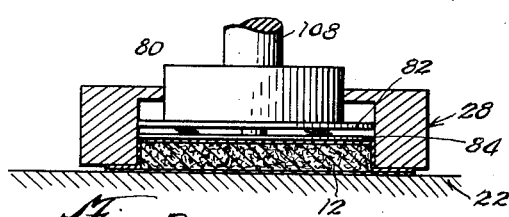
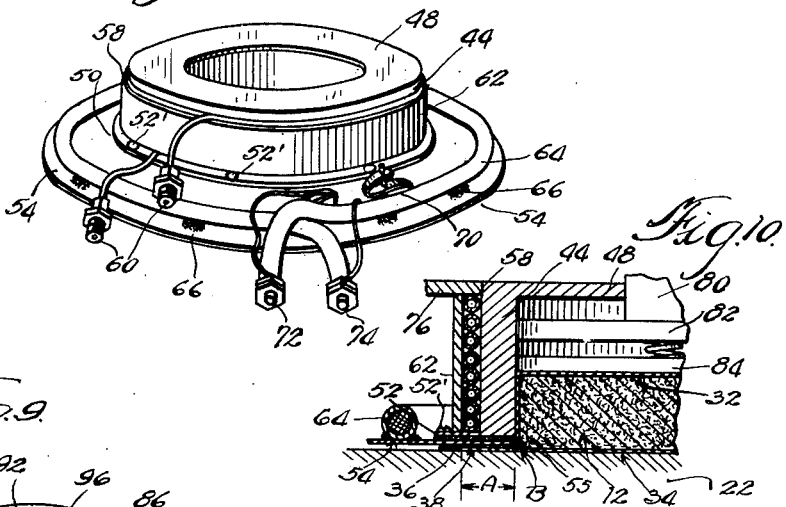
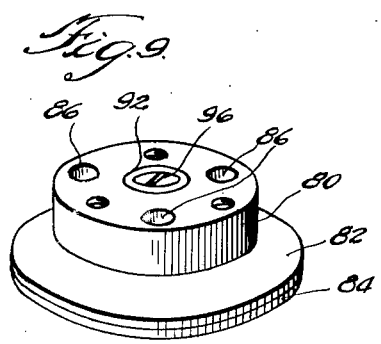
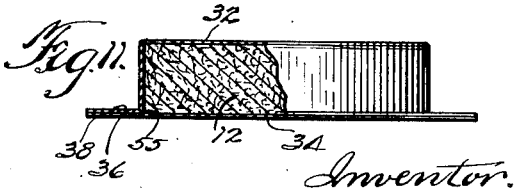
Inventor.
Frederick F. Starzyk.

Patented June 9, 1953

2,641,094

UNITED STATES PATENT OFFICE 2,641,094

MEAT PATTY FORMING AND SEALING MACHINE

Frederick F. Starzyk, Chicago, Ill., assignor to Tenderet Sales Company, Chicago, Ill., a corporation of Illinois Application November 23, 1948, Serial No. 61,599

7 Claims. (Cl. 53—55)

This invention relates to a forming and sealing apparatus for comestibles and, more particularly, to the mold or molding device for such an apparatus.

The advantage of self-service merchandising, particularly in the food retail business, has long been recognized by the merchant as well as the customer. The results, however, of merchandising fresh meat and the like in this manner have not been successful because of some inherent characteristics of the meat itself as well as the cost of preparing the meat for display and sale. First of these characteristics is: That when meat is exposed to the atmosphere for any prolonged period, whether refrigerated or not, its natural color, flavor, and moisture content are impaired. Secondly, it is exceedingly vulnerable to attack by bacteria and mold spores which are constantly present in the atmosphere.

To rectify these difficulties, it was found that hermetically sealing such comestibles was required. However, this operation had its shortcomings because the content of the package was frequently scorched, burned, cooked, or injured by the heat applied to the wrapping material to make the seal. To avoid this result, the sealing edge of the package was set off or spaced from the contents. This necessitated the use of more wrapping material which increased the cost of operation and resulted in the formation of air pockets within the package. These air pockets were found to be undesirable, namely because the quality of the contents became impaired through oxidation thereof and, secondly, the package became frosted when refrigerated which caused the package to be less attractive and appealing to the prospective purchaser. The attractiveness and the appetizing appearance of the product are essential to successful self-service merchandising.

Heretofore, the forming and sealing of such comestibles was done either manually, which was slow and costly, or by machine in two or more operations.

Thus, it is one of the objects of this invention to provide a mold which will form and seal the comestible simultaneously in a single operation.

It is a further object of this invention to provide a molding device which will hermetically seal the comestible without causing undesirable air pockets to be enclosed therein.

It is a further object of this invention to provide a molding and sealing device which will not scorch, burn, cook, or injure the comestible during the sealing operation.

It is a still further object of this invention to provide a device which will effectively, efficiently, and attractively form and seal a plastic comestible.

Further and additional objects will appear from the description, accompanying drawings, and appended claims.

In accordance with one embodiment of this invention, a mold for a forming and sealing apparatus is provided comprising a forming ring adapted to be moved transversely relative to the base member of such apparatus and encompass a mass of plastic comestible placed thereon, a presser plate adjustably mounted within said ring, and means associated within said ring for sealing said comestible simultaneously with the shaping thereof by the presser plate.

For a more complete understanding of this invention, reference should now be had to the drawings wherein:

Fig. 3 is a top plan view of the mold;

Fig. 4 is a fragmentary sectional view of the mold taken along line 4—4 of Fig. 3;

Figs. 5, 6 and 7 are diagrammatic views illustrating the steps of forming and sealing;

Fig. 8 is a perspective view of the sealing plate which is a component part of the forming ring;

Fig. 9 is a perspective view of a portion of the presser plate;

Fig. 10 is an enlarged fragmentary sectional view of the mold taken along line 10—10 of Fig. 3 and shown with the guide plate omitted and a package of plastic comestibles being formed and sealed by the mold; and Fig. 11 is a view partly in section and partly in elevation of a sealed package.

Figure 1:
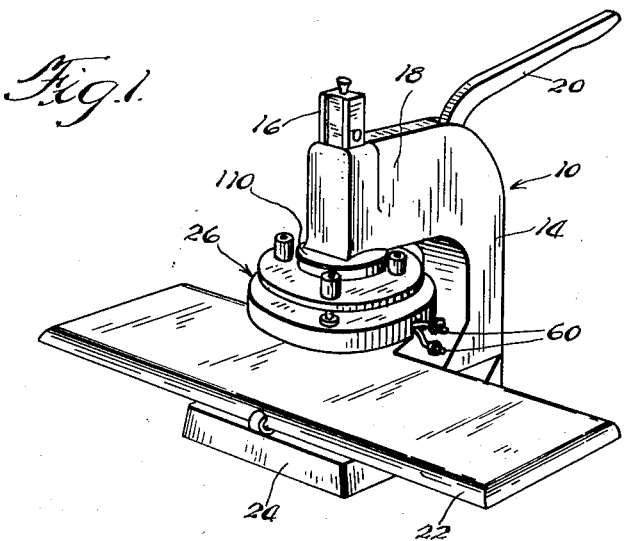
Fig. 1 is a perspective view of the apparatus shown with the mold operatively mounted thereon.

Referring now to the drawings and more particularly to Fig. 1, a forming and sealing apparatus 10 for plastic comestibles 12 and the like is shown comprising a substantially U-shaped frame 14, a vertically disposed shaft or column 16 adjustably mounted on one arm 18 of said frame, a handle 20 for actuating said shaft, a substantially flat, horizontal molding block 22 mounted on the other arm 24 of said frame, and a molding head 26 detachably secured to said shaft 16 intermediate the arms of said frame.

For simplicity of illustration and understanding, apparatus 10 is shown. It is to be understood, however, that molding head 26 may be used in an apparatus where the operation is automatically controlled.

Figure 2:
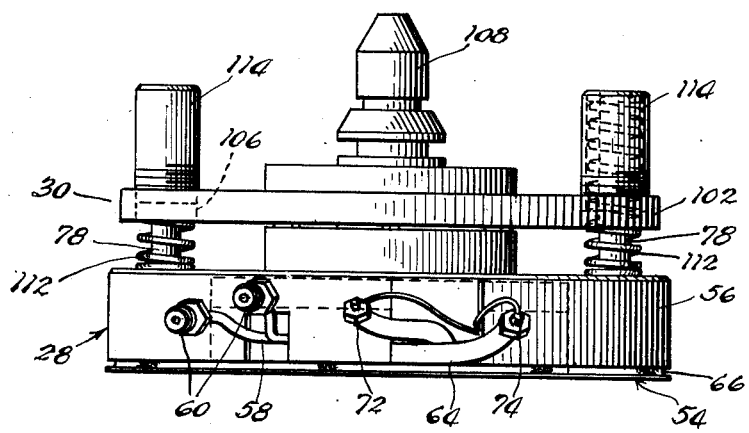
Fig. 2 is an enlarged side elevation view of the mold.

Mold 26, as shown in Figs. 2, 3 and 4, is composed primarily of two component parts, namely: a forming ring assembly 28 and the presser plate assembly 30.

As shown in Fig. 5, a mass of plastic comestible 12, sandwiched between two sheets 32 and 34 of heat sealing, transparent, moisture- and airproof material, such as cellophane, is placed on the molding block 22 directly under the mold 26. The sheets 32 and 34 are slightly larger in diameter than the ultimate size of the package, which, in this instance, is patty or disc shape. Movement of handle 20 downwardly moves mold 26 toward block 22 and the forming ring 28 begins to encompass the mass causing the outer rim portion 36 of the upper sheet 32 to be bent over toward sheet 34. Upon further downward movement of the handle, the ring encompasses the mass (see Fig. 7) and forces the outer rim portion 36 of sheet 32 to contact the outer rim portion 38 of the lower sheet 34. The ring, while so positioned, is restrained from any further movement, and the presser plate assembly 30, with its plate 84 mounted within said ring, continues to move downwardly and compresses the mass so that it conforms exactly to the shape of the ring. This compression of the mass forces the air out of the package and eliminates the danger of air pockets being sealed therein. When the mass has been compressed to a predetermined thickness, instantaneous heat is applied to the outer rim portions 36 and 38 of upper and lower sheets 32 and 34 to effect the seal. The walls or sides of collar 44 of the ring are water cooled to prevent the outer portion of the mass from becoming scorched, burned, cooked or injured. The method of heating the underside of the ring and cooling the walls thereof will be discussed more fully later. As seen in Figs. 10 and 11, the seal is made adjacent to the mass which results in a tightly wrapped package.

Forming ring 28 includes collar member 44 having its upper end provided with an inwardly projecting flange 48 and its lower end provided with an outwardly projecting flange 52. A heat resistant liner or washer 50 is clamped between flange 52 and a heat sealing plate 54. Plate 54 is carried at the lower end of the collar 44 by suitable securing means such as screws 52' shown in Figs. 8 and 10. A cover 56 is adapted to fit over collar 44 to enclose a heating element 64. Surrounding collar member 44 and disposed on the outer face thereof, but within cover 56, is a cooling coil 58 through which water or the like is circulated. Appropriate fittings 60 are provided for connecting the coil to a water supply (not shown). Embracing the outside of the coil 58 is a shield 62. Heating element 64 is mounted as by spot welding at 66 or the like upon the upper surface of sealing plate 54, as seen in Fig. 8. It may or may not be spaced from collar 44. A thermostatically controlled switch 70 regulates the flow of current through the element 64 and provides the proper temperature for effecting a seal at the peripheries of sheets 32 and 34. Excess heating is prevented so that cooling coil 58 will keep collar 44 at a temperature that will not affect the comestible being sealed. Terminals 72 and 74 are provided for connecting an appropriate electrical power supply (not shown) to the mold. Sealing plate 54 is disc-like in shape and has its center cut to conform to the inside periphery of collar 44. Cover 56, which fits over collar 44, cooling coil 58 and heating element 64, is substantially cup-shaped and has the upper end 76 thereof embracing the collar. Extending vertically from the upper end 76 of cover 56 are symmetrically arranged and uniformly spaced guide posts 78.

Presser plate assembly 30 includes a presser head 80 carrying at its lower end a flange or integral plate 82 shaped to conform to the inside periphery of collar 44. A plate 84 is adjustably secured to said head 80 and adapted to be normally held in spaced relationship with respect to said plate 82. Presser head 80 is provided with a plurality of cavities 86 axially extending therethrough in which are seated coil springs 88. When the presser plate 30 is assembled, the coil springs 88 hold the plate 84 away from the lower end 82 of the head. Plate 84 is secured to a transversely mounted stud 90 which is adapted to slidably engage in a suitable opening 92 formed in head 80. A screw 94 having an enlarged head 96 is threaded into the stud in an axial direction. The outer periphery of the enlarged head 96 is adapted to engage a sleeve 98, which is fixedly mounted within opening 92 to prevent displacement of plate 84 from presser head 80. Presser head 80 is secured at its upper end 100 to a guide plate 102 by means of bolts 104 countersunk in said plate. This guide plate is substantially flat and circular in form and is provided with a plurality of openings 106 (Fig. 2) arranged so as to allow the aforementioned guide posts 78 to extend therethrough. Centrally positioned and extending upwardly from guide plate 102 is a spindle 108 which is shaped to conform to a corresponding socket formed in lower end 110 of the column 16 of frame 14 and adapted to be rotatably locked therein. When guide plate 102 is secured to presser head 80, coil springs 88 exert a downward force on plate 84. Upon compressing the mass of comestible 12, the plate 84 acts as a buffer to compensate for any variation of the mass as it is fed upon lower sheet 38 as shown in Fig. 5.

Embracing each guide post 78 is a spring 112 which rests on the upper end 76 of cover 56. Over the free end of the guide post and spring 112 is fitted a cap 114 which is threaded into the opening 106 formed in the guide plate 102. Springs 112 act to lift the presser plate assembly 30 upwardly with respect to the forming ring assembly 28. This relative movement between these two parts lifts plate 84 upwardly in collar 44, so that the package of comestible just sealed is prevented from sticking to plate 84 and is readily stripped from collar 44 and dropped upon table 22.

The structure herein disclosed is designed to effect a very efficient heat seal between the upper and lower sheets without transmitting heat to the meat or other comestible being wrapped to the extent of scorching, cooking or otherwise affecting the same. The forming ring 28 is notably provided with a cooling unit between the heater and the food being packaged and the heat is transmitted from the heater to the peripheral portions of the sheets being sealed so that practically no part of the heating plate 54 functioning to effect the sealing action will be brought into contact with the food. Heating plate 54 is made as thin as possible, the only requirement being that sufficient heat will be transmitted to area "A" (Fig. 4) to effect a seal between the upper and lower wrapper sheets. With an arrangement of this type, only the edge "B" will be exposed to the chamber 51 of forming ring 28. The exposed area of edge "B" will in practice be so small that the heat transfer therefrom to the package being sealed will be negligible. The time of the sealing operation is also a factor that minimizes the effect of the heat at face "B" and makes it a matter of no concern in the forming of the comestible into a package unit between the wrapper sheets 32 and 34 and the sealing of the peripheral portions thereof. Cooling coil 58 also effectively protects ring 28 from being heated by heating coil 64. It is understood, of course, that thermostat 70 will govern the temperature at this heater so that a balance can easily be had between the action of the cooling coil 58 keeping ring 28 cool and the heater 64 keeping the plate 54 at a temperature to effect a sealing action.

The action of plate 84 being resiliently cushioned by springs 86 against the comestible between the upper and lower wrapper sheets 32 and 34 effects a perfect forming operation and at the same time forces the air from the package at the peripheral edges of the wrappers. The sharp corner which face "B" of heating plate 54 offers causes the seal to be brought directly to the lower edge of the formed comestible as illustrated at 55 in Fig. 11 and thus excludes all air from the finished package. I believe that I am the first to provide package forming and sealing apparatus that will wrap food like meat, cheese, etc., and provide a sealed edge excluding air from within the package and not affect the food by the heat used in the sealing operation. By excluding air and effecting a heat seal without cooking or otherwise affecting the food, the latter will retain its fresh color or appearance for a longer period and dehydration thereof will be prevented. Also, in the event of refrigeration, the moisture will not form a frosty appearance on the surface of the food so as to discolor the same and present a displeasing appearance.

It will be obvious that certain modifications of the specific embodiment shown may be made without departing from the spirit and scope of this invention. For example, the inside periphery of the collar may be varied to any shape desired depending on the comestible to be sealed. Also, as heretofore mentioned, the mold may be mounted on an automatically operated apparatus.

Thus it will be seen that a mold or molding device has been provided which will simultaneously form and seal a plastic comestible in a single operation. Furthermore, a method of forming and sealing a plastic comestible has been provided which will not burn, scorch, cook, or injure the comestible and will eliminate the formation of air pockets within the sealed package. Also, a method of forming and sealing fresh meat has been provided which enables such a comestible to be readily adaptable to the popular self-service type of merchandising.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. A mold for use with a forming and sealing apparatus having a base adapted to receive a mass of plastic comestibles sandwiched between sheets of heat-sealing, air and moisture-proof material, said mold comprising a forming ring mountable on said apparatus for movement into and out of abutting relation with said base and when in abutting relation to effect encompassing of said mass by said sheets and cause partial forming of said mass, a presser plate mounted on said ring for movement independently thereof to effect final forming of said mass when said ring is in abutting relation with said base, means mounted on said ring for instantaneously applying heat to said sheets and effecting a seal thereof contiguous to the periphery of said mass when in final form, and means mounted on said ring for maintaining the periphery of said mass in a relatively cool state during the effecting of said seal.

2. A mold for use with a forming and sealing apparatus having a substantially flat base adapted to receive a mass of plastic comestibles disposed between two, heat-sealable wrapper sheets, comprising an apertured forming ring mountable on said apparatus for movement into and out of abutting relation with said base and cause encompassing of said mass by said sheets, a presser plate mounted on said ring in registration with said ring aperture and adapted to cooperate with said ring when in said abutting relation to effect forming of said mass so that the periphery thereof corresponds to the perimeter of said ring aperture, and means mounted on said ring for contacting a portion of said wrapper sheets and momentarily heating the same to effect a seal between said wrapper sheets contiguous to the periphery of said formed mass; said means comprising an apertured sealing plate mounted on the side of said ring adjacent said base, the aperture of said sealing plate being coincident to the aperture of said ring, a heat resistant lining disposed intermediate said sealing plate and ring, and means for heating said sealing plate when said ring is in abutting relation with said base.

3. A mold for use with a forming and sealing apparatus having a substantially flat horizontal base adapted to receive a mass of plastic comestibles disposed between two, heat-sealable wrapper sheets, comprising an apertured forming ring mountable on said apparatus for vertical movement into and out of abutting relation with said base and effect encompassing of said mass by said sheets, said ring provided with a vertically extending flange surrounding said aperture, a presser plate mounted on said ring for independent vertical movement within said ring aperture and adapted, when said ring is in abutting relation, to compress said mass of comestibles to the peripheral shape of said ring aperture, an apertured sealing plate mounted on the undersurface of said ring and adapted to apply momentary heat to said sheets and effect a seal therebetween contiguous to the periphery of said compressed mass, the apertures of said ring and sealing plate being coincident to one another, a heat resistant liner disposed intermediate said ring and sealing plate, and means mounted on said ring and juxtaposed said vertically extending flange for effecting cooling of the peripheral surface of said compressed mass during sealing of said sheets.

4. A mold for use with a forming and sealing apparatus having a base adapted to receive a comestible disposed between two wrapper sheets comprising a forming ring movable into and out of abutting relation with respect to said base, a presser plate adjustably mounted within said ring for movement independently thereof, and heating means mounted on said ring adjacent said base and coacting with said plate, when said ring is in abutting relation with said base, for forming said comestible and effecting a heat seal between said wrapper sheets about and contiguous to the periphery of the formed comestible.

5. A mold for use with a forming and sealing apparatus having a base adapted to receive a plastic comestible sandwiched between two sheets of heat-sealing, air and moisture proof wrapping material comprising a hollow open-ended forming ring movable into and out of abutting relation with respect to said base, a presser plate adjustably mounted on said ring for movement independently thereof, the periphery of said plate conforming substantially to the interior contour of said ring, and heating means mounted on said ring adjacent said base and coacting with said plate, when said ring is in abutting relation with said base, for forming said comestible and effecting simultaneously therewith a hermetic seal between said sheets about and contiguous to the periphery of the formed comestible.

6. A mold for use with a forming and sealing apparatus having a base for receiving a plastic comestible disposed between two wrapper sheets comprising a forming ring movable into and out of abutting relation with respect to said base, a presser plate adjustably mounted within said ring for movement independently thereof, and heating means mounted on and insulated from the surface of said ring adjacent said base and coacting with said plate, when said ring is in abutting relation with said base, for forming said comestible and effecting simultaneously therewith a heat seal between said sheets about and contiguous to the periphery of the formed comestible.

7. A mold for use with a forming and sealing apparatus having a substantially flat base for receiving a mass of plastic comestible disposed between two wrapper sheets comprising a forming ring movable into and out of abutting relation with respect to said base and encompassing said mass when in said abutting relation, a presser plate adjustably mounted with respect to said ring for movement independently thereof to effect forming of said mass, and means mounted on the surface of said ring adjacent said base for contacting a portion of said wrapper sheets and momentarily heating the same to effect a heat seal between said wrapper sheets about and contiguous to the periphery of the formed mass of said plastic comestible.

FREDERICK F. STARZYK.

References Cited in the file of this patent

UNITED STATES PATENTS

| Number | Name | Date |
|---|---|---|
| 1,813,769 | Riba | July 7, 1931 |
| 2,048,447 | Hewitt | July 21, 1936 |
| 2,069,696 | Burk | Feb. 2, 1937 |
| 2,219,889 | Federighi et al. | Oct. 29, 1940 |
| 2,224,390 | Holly | Dec. 10, 1940 |
| 2,232,783 | Hausheer | Feb. 25, 1941 |
| 2,241,943 | Berch | May 13, 1941 |
| 2,260,780 | Holly | Oct. 28, 1941 |
| 2,289,618 | Young | July 14, 1942 |
| 2,373,781 | Richardson | Apr. 17, 1945 |
| 2,378,324 | Ray et al. | June 12, 1945 |
| 2,496,609 | Van Antwerpen | Feb. 7, 1950 |